United States Patent [19]

Inada et al.

[11] Patent Number: 5,782,983
[45] Date of Patent: Jul. 21, 1998

[54] DEWATERING CLEANING METHOD, DEWATERING CLEANING APPARATUS, AND CONCENTRATION TYPE FILTER FOR USE THEREIN

[75] Inventors: Minoru Inada, Yokohama; Yasutaka Imajo; Kimiaki Kabuki, both of Tokyo; Nobuhiro Saitoh, Ohta, all of Japan

[73] Assignees: Kabushiki Kaisha Toshiba, Kawasaki; Toshiba Silicone Co., Ltd., Tokyo, both of Japan

[21] Appl. No.: 196,067

[22] PCT Filed: Aug. 27, 1992

[86] PCT No.: PCT/JP92/01088

§ 371 Date: Apr. 19, 1994

§ 102(e) Date: Apr. 19, 1994

[87] PCT Pub. No.: WO93/04755

PCT Pub. Date: Mar. 18, 1993

[30] Foreign Application Priority Data

Aug. 30, 1991 [JP] Japan ................................ 3-220643

[51] Int. Cl.⁶ ........................... B08B 3/12; B08B 7/04
[52] U.S. Cl. .................... 134/1; 134/10; 134/13;
210/649; 210/748; 210/765; 210/791; 210/800;
210/805; 210/500.21; 210/502.1; 210/506;
210/777; 210/749
[58] Field of Search ................ 210/209, 506,
210/777, 765, 799, 805, 194, 196, 323.1,
340, 649, 748, 749, 791, 800, 500.21, 502.1;
134/1, 10, 13

[56] References Cited

U.S. PATENT DOCUMENTS

| | | | |
|---|---|---|---|
| 3,498,923 | 3/1970 | Zisman | 252/171 |
| 3,511,708 | 5/1970 | Zisman | 134/40 |
| 3,516,938 | 6/1970 | Zisman | 252/171 |
| 3,903,012 | 9/1975 | Brandreth | 252/194 |
| 4,290,896 | 9/1981 | Gordon | 210/710 |
| 4,745,690 | 5/1988 | Koop et al. | |
| 5,503,681 | 4/1996 | Inada et al. | |
| 5,538,024 | 7/1996 | Inada et al. | |
| 5,593,507 | 1/1997 | Inada et al. | |

FOREIGN PATENT DOCUMENTS

| | | |
|---|---|---|
| 54-126678 | 10/1979 | Japan. |
| 56-73517 | 6/1981 | Japan. |
| 58-33002 | 7/1983 | Japan. |
| 59-24841 | 6/1984 | Japan. |
| 59-27602 | 7/1984 | Japan. |

(List continued on next page.)

OTHER PUBLICATIONS

Handbook of Surface Preparation, R.C. Snogren, (1974), pp. 111–112, 311, 423–425.

Perry's Chemical Engineers Handbook 6th ed., (1984), pp. 20–25.

Encyclopedia Chemical technology, Kirk–Othmer, (1980), vol. 10, pp. 897–900.

Encyclopedia Chemical technology, Kirk–Othmer, (1983), vol. 21, pp. 355–376.

*Primary Examiner*—Robert Popovics
*Attorney, Agent, or Firm*—Foley & Lardner

[57] ABSTRACT

A part still wet with water or an aqueous type detergent adhering to the surface thereof is drain washed in a washing tank using a hydrophobic dewatering cleaning agent. In this operation of dewatering cleaning, the hydrophobic dewatering cleaning agent stored in the washing tank is circulated between the washing tank and a reserve tank to deprive the hydrophobic dewatering cleaning agent of water entrained thereby by means of a concentration type filter inserted in a path laid for the circulation. A hydrophobic filter is mainly used as the concentration type filter. The dewatering cleaning is continued and meanwhile the consequently isolated hydrophobic dewatering cleaning agent is exclusively returned to the washing tank. As a result, the water concentration in the hydrophobic dewatering cleaning agent stored in the washing tank can be constantly kept below a prescribed level.

43 Claims, 6 Drawing Sheets

FOREIGN PATENT DOCUMENTS

| | | |
|---|---|---|
| 62-142629 | 6/1987 | Japan . |
| 62-183804 | 8/1987 | Japan . |
| 63-119806 | 5/1988 | Japan . |
| 1-65618 | 4/1989 | Japan . |
| 3-16604 | 1/1991 | Japan . |
| 91/06621 | 5/1991 | WIPO . |
| 91/13697 | 9/1991 | WIPO . |
| 92/03205 | 3/1992 | WIPO . |

5,782,983

1

DEWATERING CLEANING METHOD, DEWATERING CLEANING APPARATUS, AND CONCENTRATION TYPE FILTER FOR USE THEREIN

FIELD OF THE INVENTION

This invention relates to a dewatering cleaning method and a dewatering cleaning apparatus capable of imparting increased stability that enhances the quality of cleaning and to a concentration type filter for use therein

BACKGROUND OF THE INVENTION

Heretofore, it has been a common practice to use a fluorinated hydrocarbon (Flon) type solvent, a chlorine type solvent, or the vapor thereof for washing various parts which are smeared with oil-soluble dirt or water-soluble dirt. In recent years, however, such detergents as the Flon type solvent mentioned above have been arousing serious public anxiety about the effects they produce on human bodies and the environment. Thus, the desirability of a washing method which is capable of superprecision washing comparable favorably with that obtainable with the Flon type solvent without adversely affecting the environment has been finding enthusiastic recognition.

As detergents useful as substitutes for the Flon type solvent, therefore, various aqueous and nonaqueous substitute detergents such as, for example, aqueous detergents and organic solvent type chlorine-free detergents have been proposed. The feasibility of washing with these detergents has been being studied. Particularly the combination of the aqueous washing among other types of washing with a suitable water-treating device has a bright prospect of popular acceptance because it exerts very little adverse effect on the environment.

Since most of the substitute detergents mentioned above require a step of rinsing to follow the step of washing, the washing operation using such a substitute detergent generally follows the practice of giving a rinse with water to a washed part. After the rinse with water has been carried out, the water adhering to the surface of the rinsed part must be uniformly and quickly dried for the sake of quality of the washing. By the currently prevailing method of forcibly vaporizing water such as is effected with hot air, however, it is very difficult to prevent the occurrence of watermarks on the dried surface of the part. Besides, the vapor washing which uses such a low boiling organic solvent as isopropyl alcohol (hereinafter referred to as "IPA") has been in vogue. When a part still wet with adhering water is directly subjected to the vapor washing, however, it is very difficult to preclude the occurrence of watermarks as in the case of drying with hot air.

For the purpose of solving the problem described above, the feasibility of the cleaning by displacement of water (dewatering cleaning) using a dewatering cleaning agent has been studied. The dewatering cleaning agent is a nonFlon detergent which has an ability to displace water, exhibits no compatibility with water, and avoids boiling at the temperature prevalent in current of drying. Specifically, the dewatering cleaning comprises immersing the part wet with adhering water in the dewatering cleaning agent, causing the adhering water to be displaced by the cleaning agent, and then drying the dewatering cleaning agent. By the dewatering cleaning which is performed as described above, such adverse results of the rinsing operation such as watermarks can be prevented. The method of cleaning which combines a degreasing treatment inclusive of water washing with the dewatering cleaning, therefore, is expected to serve as a method of cleaning capable of taking the place of the washing by the use of a Flon type detergent. Heretofore, a Flon type solvent which contains a small amount of surfactant has often been used in the rinse washing. Continuous efforts made to develop various practicable dewatering cleaning agents capable of taking the place of such Flon type solvents as mentioned above.

When the washed part, which is still wet with adhering water, is subjected to the dewatering cleaning by the use of such a non-Flon type dewatering cleaning agent as described above, the water which is consequently removed from the washed part is naturally destined to mingle with the dewatering cleaning agent. For the sake of stabilizing the cleaning quality, it is necessary to keep the concentration of water in the dewatering cleaning agent below a fixed level and preclude the otherwise possible redeposition of the water on the part by removing the water which has passed into the dewatering cleaning agent.

Regarding such a means to remove the water from the dewatering cleaning agent, it is conceivable, for example, to make use of the phenomenon of distillation which separates the dewatering cleaning agent and the water from each other by virtue of the difference in boiling points between the two components and consequently allows the removal of the water from the dewatering cleaning agent. The method which effects the separation and removal of the water by this distillation, however, is at a disadvantage in necessitating a large volume of energy for the sake of vaporization. It also entails the danger of inflammation when the dewatering cleaning agent to be used happens to be a flammable solvent. When the dewatering cleaning agent is of a hydrophobic quality and a sufficiently large difference of specific gravity exists between the dewatering cleaning agent and water, the removal of the water can be attained by a precipitation method. The method which relies on removal by precipitation, however, has the disadvantage that minute water drops suspended freely in the dewatering cleaning agent cannot be thoroughly removed.

This invention alleviate the problems mentioned above. An object of the invention is to provide a dewatering cleaning method and a dewatering cleaning apparatus which always give parts a stable and clean quality by enabling the included water to be effectively removed from the non-Flon type dewatering cleaning agent. Another object of this invention is to provide a concentration type filter for use with the method and apparatus mentioned above.

DISCLOSURE OF THE INVENTION

This invention is directed to a method for dewatering cleaning in a cleaning tank using a hydrophobic dewatering cleaning agent a part already washed with water or an aqueous type detergent and still remaining wet with said water or aqueous type detergent adhering to the surface thereof, the method comprising the steps of: transmitting circularly said hydrophobic dewatering cleaning agent from said cleaning tank to a reserve tank; depriving said hydrophobic dewatering cleaning agent of said water or aqueous type detergent entrained therein by means of a concentration type filter while circulating said hydrophobic dewatering cleaning agent transmitted to said reserve tank via said concentration type filter, said concentration type filter being a part of a circulation path; and returning the consequently isolated hydrophobic dewatering cleaning agent exclusively to said cleaning tank.

The cleaning apparatus of this invention comprises a cleaning tank using a hydrophobic dewatering cleaning agent, comprising a dewatering cleaning means and a cleaning tank using a hydrophobic dewatering cleaning agent and adapted to give a dewatering cleaning in said cleaning tank to a part still wet with water or an aqueous cleaning agent adhering to the surface thereof; and water separating means comprising a reserve tank for temporarily storing said hydrophobic dewatering cleaning agent, a concentration type filter, and a circulation system for circulating said hydrophobic dewatering cleaning agent stored in said reserve tank via said concentration type filter and adapted to deprive said hydrophobic dewatering cleaning agent of said water or aqueous cleaning agent entrained therein by means of said concentration type filter and return the consequently isolated hydrophobic dewatering cleaning agent exclusively to said cleaning tank.

The concentration type filter of this invention comprises a porous filter treated with a liquid-type hydrophobic treating agent containing at least a hydrolyzable organosilane represented by the general formula:

$$R_nSiX_{4-n} \quad (1)$$

(wherein R stands for a monovalent hydrocarbon group of 1 to 18 carbon atoms, X for a hydrolyzable group, and n for an integer from 1 to 3).

The water which has mingled with the hydrophobic dewatering cleaning agent can be roughly separated from the produced mixture by virtue of sedimentation due to the difference in specific gravity between the hydrophobic dewatering cleaning agent and the water. The minute water drops which are suspended in the hydrophobic dewatering cleaning agent, however, cannot be separated by the sedimentation within a short span of time. This invention effects the removal of the water or the aqueous type detergent which has mingled with the hydrophobic dewatering cleaning agent by installing a reserve tank for temporarily storing the hydrophobic dewatering cleaning agent extraneously containing the water, transmitting circularly the hydrophobic dewatering cleaning agent through a path laid across the reserve tank and a cleaning tank, and passing the stream of the hydrophobic dewatering cleaning agent through a concentration type filter installed in the circulation path. By the use of the concentration type filter such as, for example, a concentration type hydrophobic filter, even the minute water drops can be completely removed. Thus, the hydrophobic dewatering cleaning agent containing no water can be selectively returned stably to the cleaning tank. Since the dewatering cleaning can be constantly attained by using the hydrophobic dewatering cleaning agent having a water concentration below a fixed allowable limit, the possible redeposition of water on a washed part can be prevented. As a result, parts can be given a cleaning of stable quality at all times.

The porous filter which has been treated with a hydrophobic treating agent containing at least a hydrolyzable organosilane represented by the formula (1) mentioned above functions as a hydrophobic filter and, at the same time, excels in durability and the ability to retain minute pores contained therein intact in their initial shape. Thus, the stability with which the separation of the water from the hydrophobic dewatering cleaning agent is accomplished can be enhanced by using this porous filter in the dewatering cleaning process of by the present invention.

DETAILED DESCRIPTION OF THE PREFERRED EMBODIMENTS

Embodiments of this invention will be described below with reference to the accompanying drawings.

Figure 1:
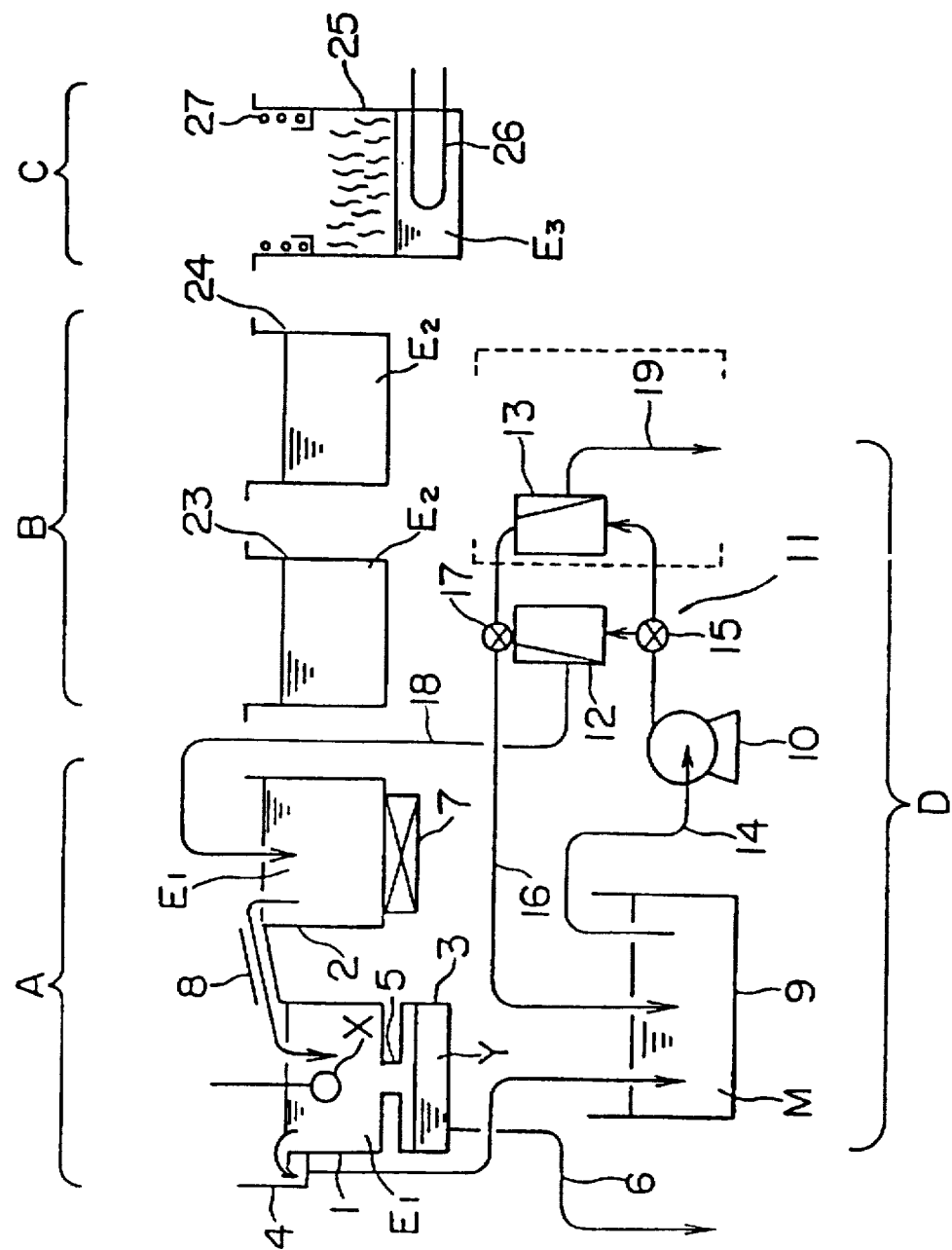
FIG. 1 is a diagram illustrating schematically the construction of a cleaning apparatus as one embodiment of this invention, FIG. 2 a diagram illustrating another example of a first cleaning tank used in the cleaning apparatus as shown in FIG. 1, FIG. 3 a diagram illustrating in outline a concentration type filter used in the cleaning apparatus as shown in FIG. 1, FIG. 4 a cross section for aiding in the description of the function of the concentration type filter used in the cleaning apparatus shown in FIG. 1, FIG. 5 a diagram schematically illustrating the mechanism of backwash used in the cleaning apparatus shown in FIG. 1, FIG. 6 a diagram for aiding in the description of the state in which a hydrophobic filter used in the cleaning apparatus shown in FIG. 1 effects the operation of water separation attained in the apparatus, FIG. 7 a diagram for aiding in the description of the state in which a hydrophilic filter used in the cleaning apparatus shown in FIG. 1 effects the operation of water separation attained in the apparatus, and FIG. 8 a diagram illustrating another example of a water separation means used in the cleaning apparatus of this invention.

FIG. 1 is a diagram illustrating the construction of a cleaning apparatus as one embodiment of this invention. The cleaning apparatus illustrated in this diagram is composed mainly of Step A for displacement of water, Step B for rinsing, and Step C for drying which are sequentially laid out in the order mentioned and Mechanism D for water separation which is attached to Step A for water displacement.

Step A for water displacement which constitutes a first step in the entire process of this invention comprises a first cleaning tank 1 which combines the functions of separation by sedimentation and of overflowing and a second cleaning tank 2 which fulfills a function of overflowing and establishes a connection to the first cleaning tank by virtue of the function of overflowing. Though the cleaning apparatus of this embodiment is depicted as using a two-bath type connected tank as the cleaning tanks in Step A for water displacement, these cleaning tanks may be selected from single-bath tanks or multiple-bath tanks, depending on the time allowed for cleaning, the quality of cleaning, etc. The number of component baths in each of the multiple-bath connected tanks may be selected based on the same principle as above.

The first and second cleaning tanks 1, 2 severally contain a hydrophobic dewatering cleaning agent $E_1$ which displaces water, exhibits no compatibility with water, and avoids boiling at the temperature prevalent in the course of drying. One example of the hydrophobic dewatering cleaning agent El which answers this description, what is obtained by adding an agent for enhancing the ability of dewatering to a hydrophobic solvent selected from among silicone type solvents, isoparaffin type solvents, and mixtures thereof. The hydrophobic dewatering cleaning agent $E_1$ requires a specific gravity smaller than that of water.

Concrete examples of the silicone type solvent, include, for example, linear polydiorganosiloxanes represented by the general formula:

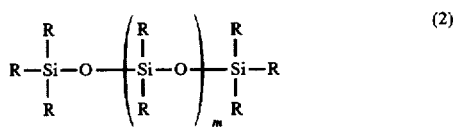

(wherein R's independently stand for a substituted or unsubstituted monovalent hydrocarbon group and m stands for an integer in the range of 0 to 10) and cyclic polydiorganosiloxanes represented by the general formula:

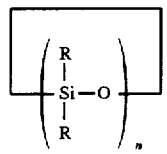

(3)

(wherein R's independently stand for a substituted or unsubstituted monovalent hydrocarbon group and n stands for an integer in the range of 3 to 7).

concrete examples of the substituent R in the formula (2) and formula (3) mentioned above, include, for example, monovalent unsubstituted hydrocarbon groups such as alkyl groups including methyl group, ethyl group, propyl group, and butyl group and phenyl group and monovalent substituted hydrocarbon groups such as a trifluoromethyl group. Among other examples of R group mentioned above, methyl group proves particularly desirable from the standpoint of stability of system, retention of volatility, etc.

concrete examples of the isoparaffin type solvent, include, for example, volatile isoparaffins having 1 to 30 carbon atoms Among other volatile isoparaffins mentioned above, isoparaffins formed mainly of fractions of $C_3$ to $C_{15}$ prove particularly desirable from the standpoint of ability to clean.

Concrete examples of the dewatering ability improving agent which is added to such a silicone type solvent or an isoparaffin type solvent as mentioned above for the purpose of imparting improved dewatering ability to the solvent, include, for example, surfactants and hydrophilic solvents. The surfactants which are effectively usable herein include cation type, anion type, nonion type, and amphoteric type surfactants and mixtures thereof, for example. The hydrophilic solvents which are effectively usable herein include alcohols such as methanol, ethanol, IPA, and benzyl alcohol, ketones such as cyclohexanone, and polyhydric alcohols such as ethylene glycol monomethyl ether, ethylene glycol monoethyl ether, ethylene glycol monopropyl ether, ethylene glycol, monobutyl ether, ethylene glycol monobutyl ether acetate, diethylene glycol monobutyl ether, propylene glycol monomethyl ether, propylene glycol monoethyl ether, propylene glycol monoethyl ether acetate, propylene glycol dimethyl ether, and propylene glycol diethyl ether and derivatives thereof, for example.

As a specific example of the hydrophobic dewatering cleaning agent $E_1$, a commercial manufacture (produced by Kabushiki Kaisha Toshiba and marketed under trademark designation of "Techno Care FRW-13") obtained by adding a surfactant as a dewatering ability improving agent to a silicone type solvent may be cited.

The first cleaning tank 1 mentioned above comprises a sedimentation separation part 3 and an overflow part 4. A part x subjected to cleaning is what has been washed with an aqueous type detergent in a separately installed washing apparatus or what has been rinsed with water. The part X is first immersed in the first cleaning tank 1. The water adhering to the surface of the part X is removed as it is displaced by the hydrophobic dewatering cleaning agent $E_1$. Owing to this displacement of the water, the removed water passes into and mingles with the hydrophobic dewatering cleaning agent $E_1$. Since the specific gravity of the hydrophobic dewatering cleaning agent $E_1$ is smaller than that of water, the water Y removed from the part X sediments in the sedimentation separation part 3 and consequently separates from the hydrophobic dewatering cleaning agent $E_1$.

The sedimentation separation part 3 and the first cleaning tank 1 are interconnected by slender pipe 5. Even when the hydrophobic dewatering cleaning agent $E_1$ in the first cleaning tank 1 happens to be stirred as by the motion of the part X into and out of the first cleaning tank 1, the stir consequently generated is prevented from being transmitted to the sedimentation separation part 3. Thus, the water Y which has o nce sedimented into the sedimentation separation tank 3 will never ascend in the form of water drops into the first cleaning tank 1. When the water Y collects in a volume exceeding a fixed level in the sedimentation separation part 3, it is discharged via a water pipe 6. As a result, the greater part of the water Y which is entrained by the part X sediments in the sedimentation separation part 3 which is connected to the lower part of the first cleaning tank 1 via the slender pipe 5 and eventually gets discharged out of the sedimentation separation part 3.

Figure 2:
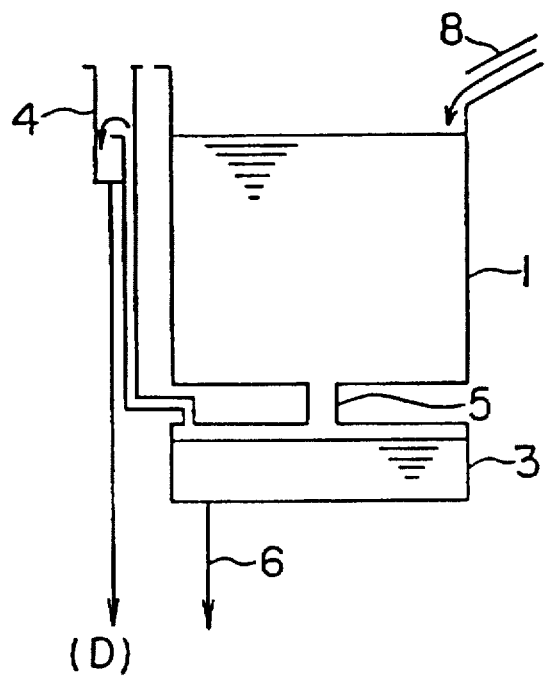

The water which has been converted into an emulsion of minute water drops idly floats in the hydrophobic dewatering cleaning agent $E_1$ and will not easily undergo separation by sedimentation. The floating w ate r is transferred together with the hydrophobic dewatering cleaning agent $E_1$ via the overflow part 4 to the water separation mechanism D. Incidentally, the overflow part 4 of the first cleaning tank 1 can be connected to the sedimentation separation part 3 as illustrated in FIG. 2.

The water which has not been separated from the part X in the first cleaning tank 1 is forcibly separated by combined use of such physical force such as is generated by ultrasonic wave in the second cleaning tank 2. This explains why an ultrasonic wave oscillator 7 is installed inside the second cleaning tank 2. The forced separation of water does not need to rely exclusively on the ultrasonic wave but may be effected by oscillation, mechanical agitation, application of heat to the detergent, or brushing, for example. These physical forces may be used, when necessary, as suitably combined. These means for the forced separation of water all the more enhance the dewatering ability.

In the second cleaning tank 2, the water is forcibly removed from the part X by such physical force as ultrasonic wave or brushing, for example. The water thus removed forcibly by the physical force is converted into an emulsion of minute water drops in the hydrophobic dewatering cleaning agent $E_1$. The minute water drops in the emulsion will not easily succumb to sedimentation separation. The water which has been converted into the emulsion, therefore, is caused to overflow together with the hydrophobic dewatering cleaning agent $E_1$ from the second cleaning tank 2 into the first cleaning tank 1 through an overflow pipe 8. This overflow is attained by causing the hydrophobic dewatering cleaning agent $E_1$ to be circulated by means of the water separation mechanism D. The overflow from the second cleaning tank 2, causes the liquid level in the first cleaning tank 1 to rise. The consequently increased amount of the liquid in the first cleaning tank 1 is transferred as described above to the water separation mechanism D via the overflow part 4 which belongs to the first cleaning tank 1.

When the water is forcibly removed from the part X by such physical force as ultrasonic wave or brushing as described above, it readily tends to float in the form of emulsion. In the first cleaning tank 1, therefore, it is desirable for the part to undergo the treatment of immersion using no such physical force as mentioned above for the purpose of enhancing the efficiency of the removal of water by sedimentation separation.

The liquid which has been forwarded from the first cleaning tank 1 via the overflow part 4 to the water separation mechanism D, namely the hydrophobic dewatering cleaning agent $E_1$ which contains water in the form of emulsion, is temporarily stored in a reserve tank 9. The water separation mechanism D including this reserve tank 9 comprises a circulation system 11 which has a liquid feed pump 10 inserted therein.

The circulation system 11 has a concentration type filter inserted thereon. A hydrophobic filter 12 is mainly used as the concentration type filter. It may be used in combination with a hydrophilic filter 13. Incidentally, FIG. 1 depicts the case of combined use of these two filters 12 and 13. In the reserve tank 9, when the hydrophobic dewatering cleaning agent $E_1$ exists in an amply large amount relative to the amount of water, the hydrophobic dewatering cleaning agent $E_1$ forms a matrix phase and the water idly floats in the form of water drops in the matrix phase. When the water exists in an amply large amount relative to the amount of the hydrophobic dewatering cleaning agent $E_1$, the water constitutes a matrix phase and the hydrophobic dewatering cleaning agent $E_1$ idly floats in the form of liquid drops in the water as the matrix. Even when the water is in the form of emulsion, it can be enabled to succumb to sedimentation separation on the condition that the liquid should be capable of securing an ample retention time in the reserve tank 9. When the reserve tank 9 is provided with such means as a water discharge pipe or a water absorbent which removes the water separated by sedimentation, the water separation mechanism D may be constructed exclusively of the hydrophobic filter 12.

The water separation mechanism D in the present embodiment effects the separation of the matrix liquid and the liquid drops with the concentration type filter which operates by virtue of the relation between the matrix liquid and the liquid drops in the emulsion mentioned above.

Figure 3:
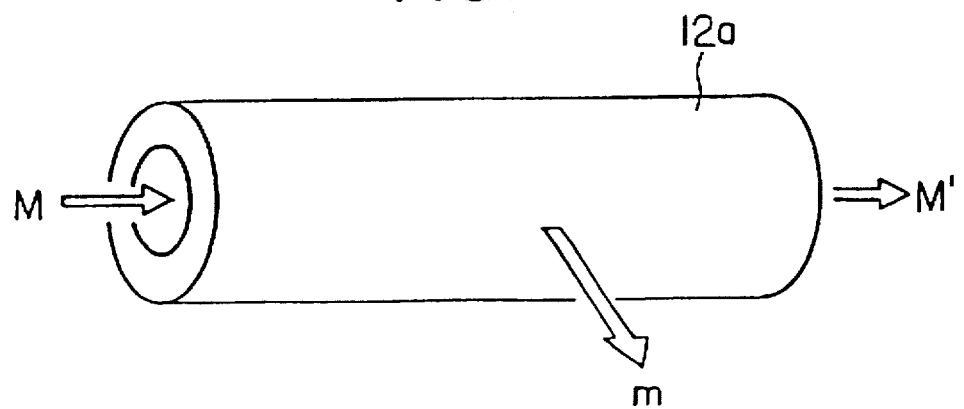
Figure 4:
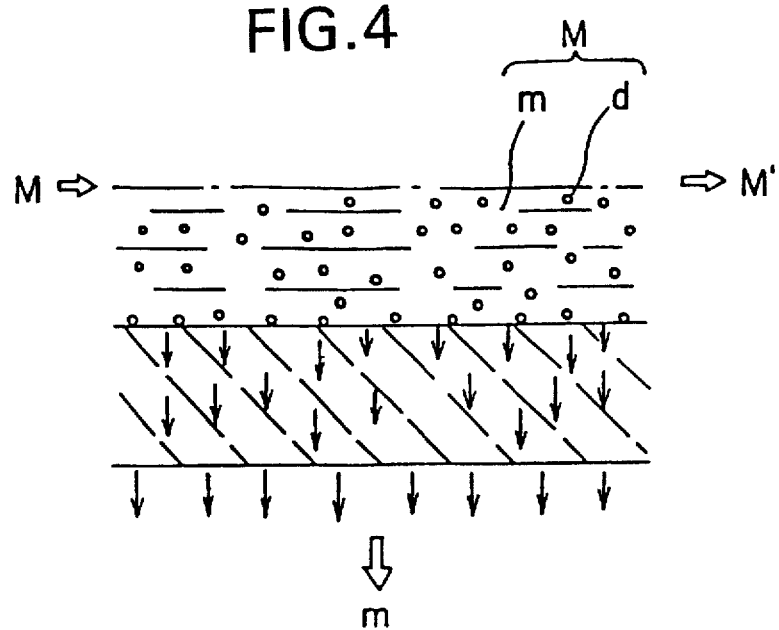

The operation of the concentration type filter which is constructed as shown above will be described below with reference to FIG. 3 and FIG. 4. When a mixed liquid M which consists of the hydrophobic dewatering cleaning agent $E_1$ and water passes through a filter element 12a, the matrix liquid exclusively permeates the filter element 12a in all directions perpendicular to the stream of the mixed liquid M. As a result, this mixed liquid M undergoes filtration. In the normal condition, namely when a matrix liquid m is the hydrophobic dewatering cleaning agent $E_1$ and the water has mingled in the form of water drops d with the hydrophobic dewatering cleaning agent $E_1$, the hydrophobic filter 12 is used as the concentration type filter. The water drops d are inhibited from permeating the hydrophobic filter element 12a and the hydrophobic dewatering cleaning agent $E_1$ which is the matrix liquid m is exclusively allowed to permeate the hydrophobic filter element 12a. At this time, the concentration of water in the mixed liquid M' which has permeated the hydrophobic filter element 12a shows an increase proportionate to the decrease caused in the amount of the hydrophobic dewatering cleaning agent $E_1$ by the permeation thereof through the hydrophobic filter element 12a. The water which has increased in consequence of the filtration may be removed as by sedimentation filtration or by the use of an absorbent as described above.

When the filtration described above is continued until the hydrophobic dewatering cleaning agent $E_1$ has mingled in the form of liquid drops d with the water as the matrix liquid m, the removal of water may be effected by using a hydrophilic filter 13 as the concentration type filter. The liquid drops d formed of the hydrophobic dewatering cleaning agent $E_1$ are inhibited from permeating a hydrophilic filter element 13a and the water as the matrix liquid m is exclusively allowed to permeate the hydrophilic filter element 13a.

In the circulation system 11 of the water separation mechanism D mentioned above, the reserve tank 9 and the concentration type filter 12 (13) are interconnected with a liquid feed pipe 14 having the liquid feed pump 10 inserted therein. The liquid feed pump 10 is desired to be a diaphragm type pump or a rotary type pump which avoids exerting shear force on the liquid being handled. This choice of the pump is important for the purpose of preventing the mixed liquid M of the hydrophobic dewatering cleaning agent $E_1$ and water from being stirred by physical force and consequently precluding the otherwise possible fine division of the liquid drops.

When the hydrophilic filter 13 is additionally used as the concentration type filter, the selective feeding of the mixed liquid M of the hydrophobic dewatering cleaning agent $E_1$ and water to the hydrophobic filter 12 or the hydrophilic filter 13 is enabled by having a three-way valve 15 in the liquid feed pipe 14. Further, a circulation pipe 16 adapted to return to the reserve tank 9 the mixed liquid M' which has undergone the filtration is connected to the concentration type filter 12 (13). When the hydrophilic filter 13 is additionally used, the circulation pipe 16 likewise has a three-way valve 17 inserted therein.

To the hydrophobic filter 12 is connected a cleaning agent resupply pipe 18 adapted to return to the second cleaning tank 1 exclusively the hydrophobic dewatering cleaning agent $E_1$ which has passed through the hydrophobic filter element 12a. The hydrophobic dewatering cleaning agent $E_1$, therefore, is circulated through the reserve tank 9, the hydrophobic filter 12, and the cleaning agent resupply pipe 18. This path constitutes a basic circulation system in the present embodiment. Further, a water discharge pipe 19 serving the purpose of discharging the water which has passed through the hydrophilic filter element 13a is connected to the hydrophilic filter 13.

Figure 5:
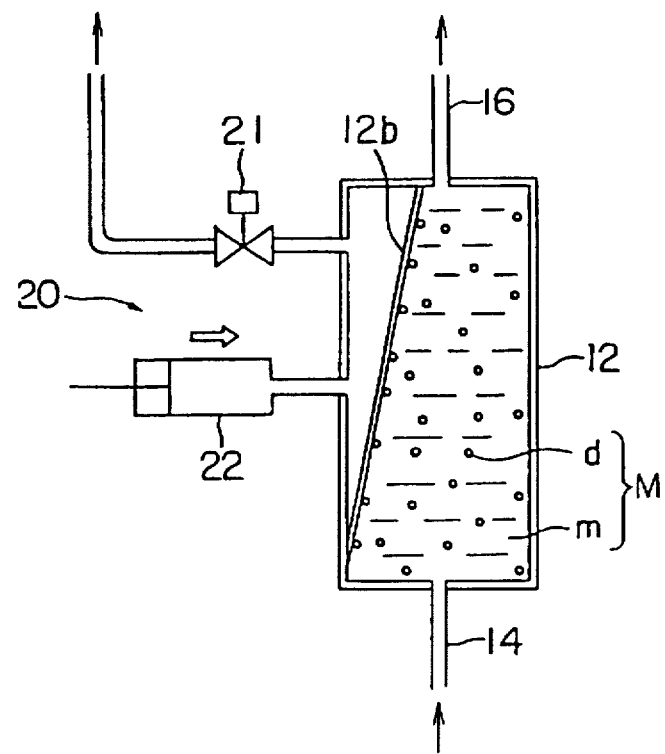

In the concentration type filter 12 (13), the efficiency of filtration is degraded in proportion as the amount of liquid drops d adhering to the inner surface of the filter element increases with the progress of filtration. For this reason, the hydrophobic filter 12 comprises a backwash mechanism 20 as illustrated in FIG. 5. When the hydrophilic filter 13 is additionally used, the hydrophilic filter 13 may be likewise provided with the backwash mechanism 20.

Now, the backwash mechanism 20 mentioned above will be described below. In the normal condition of operation, when the mixed liquid M of the hydrophobic dewatering cleaning agent $E_1$ and water passes through the hydrophobic filter 12, the hydrophobic dewatering cleaning agent $E_1$ as the matrix liquid is exclusively allowed to permeate a filter membrane 12b. At this time, the possibility arises that water drops D adhere to the surface of the filter membrane 12b. The water drops thus deposited on the filter membrane 12b consequently clog the pores in the filter membrane 12b. The amount of the hydrophobic dewatering cleaning agent $E_1$ which permeates the filter membrane 12b decreases in proportion as the clogging of the filter membrane 12b advances. For the purpose of reviving the filter membrane 12b, a backwash is given to the filter membrane 12b.

As the first step in the procedure of backwashing, the conduit for the filtrate such as, for example, the cleaning agent resupply pipe 1, 8 is closed by means of a valve 21. Then, a backwash cylinder 11 holding the filtrate therein is actuated to effect injection of the filtrate toward the mixed liquid M side from a direction opposite to the filter membrane 12b. By the flow of the filtrate through the filter membrane 12b, the water drops d adhering to the surface of the filter membrane 12b are removed from the surface of the filter membrane 12b. As a result, the filter membrane 12b is revived and relieved of the clogging. The time for giving this backwash to the filter membrane 12b may be decided by monitoring the amount of the filtrate.

Figure 6:
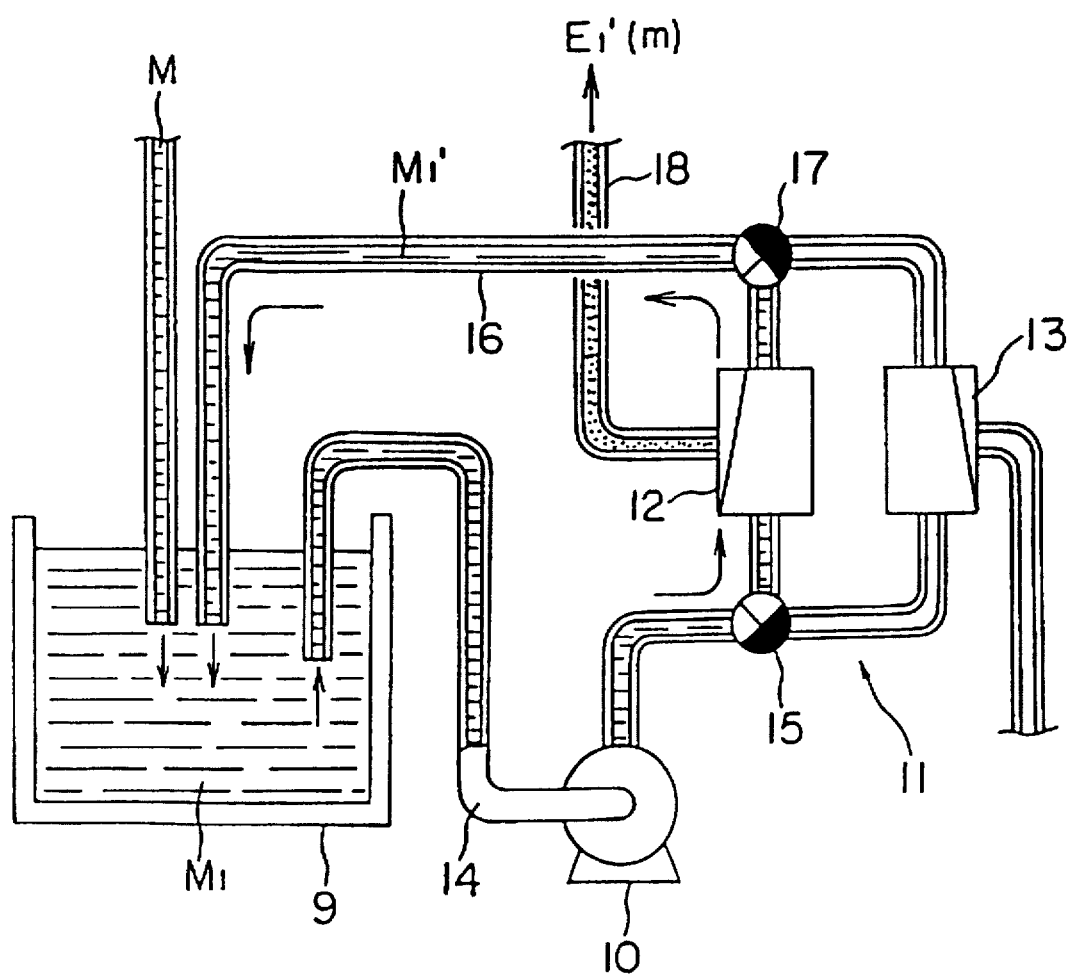
Figure 7:
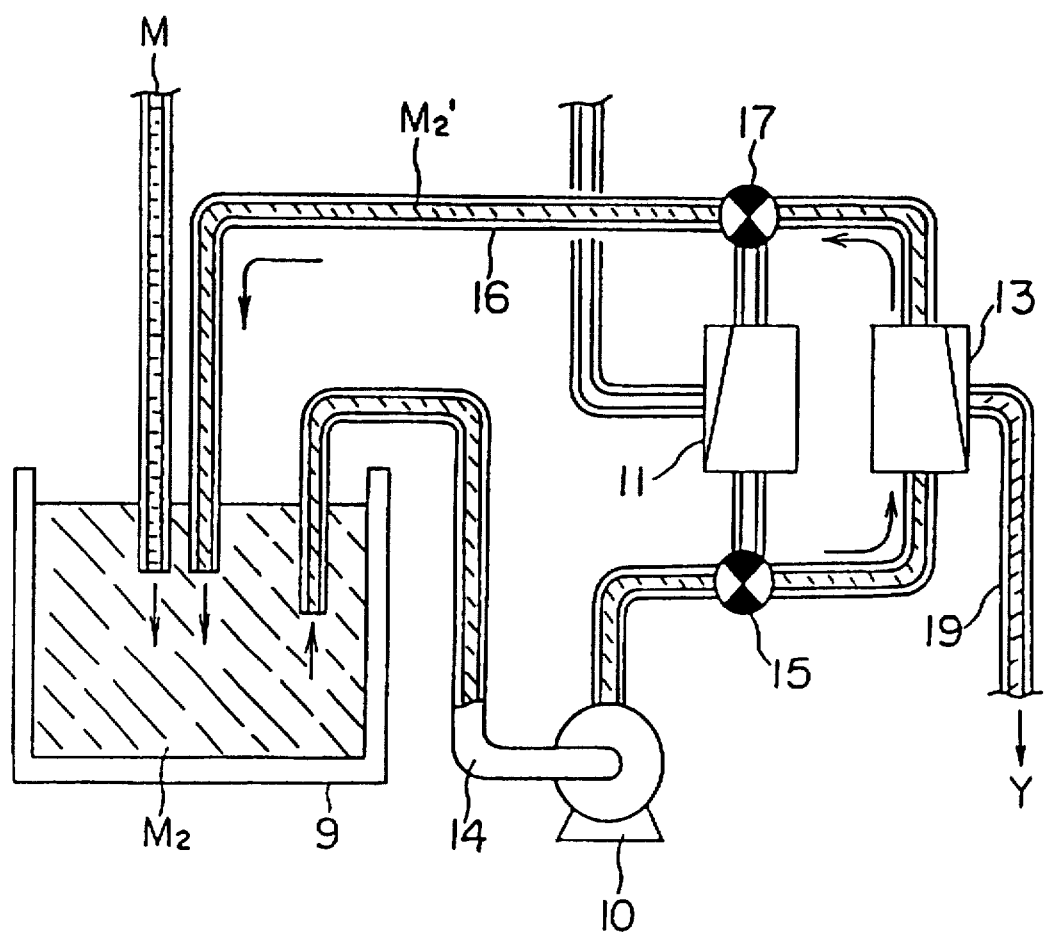

Then, the operation of the water separation mechanism D which is constructed as described above will be more specifically described below with reference to FIG. 6 and FIG. 7.

The mixed liquid M composed of the hydrophobic dewatering cleaning agent $E_1$ and water and stored in the reserve tank 9 has the dewatering cleaning agent $E_1$ as a matrix thereof in the normal state of the mixed liquid M. The mixed liquid $M_1$, therefore, is forwarded to the hydrophobic filter 12 by the liquid feed pump 10 as shown in FIG. 6. In the hydrophobic filter 12, the hydrophobic dewatering cleaning agent $E_1$ is exclusively allowed to permeate the hydrophobic filter element 12a and the hydrophobic dewatering cleaning agent $E_1$ which constitutes a filtrate is exclusively returned via the cleaning agent resupply pipe 18 to the second cleaning tank 2.

As described above, the hydrophobic dewatering cleaning agent $E_1$ containing no water is always supplied to the second cleaning tank 2. As a result, the circulation of the hydrophobic dewatering cleaning agent $E_1$ is realized and, at the same time, the retention of the water concentration in the second cleaning tank 2 below the allowable limit to be imposed by the quality which the part X is expected to possess. Incidentally, the hydrophobic dewatering cleaning agent $E_1'$ which is returned via the cleaning agent resupply pipe 18 to the second cleaning tank 2 suffers a loss of concentration because such a dewatering ability improving agent as a surfactant dissolves into water. This problem may be overcome, for example, during the replenishment of the hydrophobic dewatering cleaning agent $E_1$ in the second cleaning tank 2 for the sake of making up for the amount of the dewatering cleaning agent E1 carried away to Step B for rinsing, by supplying to the second cleaning tank 2 the hydrophobic dewatering cleaning agent $E_1$ in which the dewatering ability improving agent has been increased by an amount equivalent to the amount of the agent spent in the water separation mechanism D. As a result of this replenishment, the hydrophobic dewatering cleaning agent $E^1$ in the first and second cleaning tanks 1 and 2 is enabled to retain the dewatering ability sufficiently constantly. When the commercial product, Techno Care FRW-13, for example, is used as the hydrophobic dewatering cleaning agent $E_1$, it is desired to contain a surfactant at a concentration of at least 0.1% for the purpose of acquiring an ability to permit ample displacement of water.

The mixed liquid $M_1$ which has had the water concentration thereof increased owing to its passage through the hydrophobic filter 12 is returned to the reserve tank 9. Thus, the mixed liquid $M_1$ is constantly circulated via the liquid feed pump 10, the hydrophobic filter 12, etc.

Incidentally, water is accumulated in the mixed liquid M held inside the reserve tank 9 in proportion as the filtration of the hydrophobic dewatering cleaning agent $E_1'$ by the hydrophobic filter 12 proceeds. The water concentration in the mixed liquid M is gradually increased. As already stated, the circulation of the hydrophobic dewatering cleaning agent is attained exclusively by the use of the hydrophobic filter 12 when this water can be removed by sedimentation separation, for example.

When the composition of the mixed liquid M in the reserve tank 9 changes and the amount of water in the mixed liquid M increases past the amount of the hydrophobic dewatering cleaning agent $E_1$, the possibility ensues that the water becomes the matrix liquid in the mixed liquid M. The state of this kind entails degradation of the efficiency with which the hydrophobic dewatering cleaning agent $E_1$ is filtered by the hydrophobic filter 12. When this state happens to arise, the water in the mixed liquid M may be removed by the use of the hydrophilic filter 13. In this case, a mixed liquid $M_2$ is forwarded to the hydrophilic filter 13 by switching the threeway valves 17 and 17 as illustrated in FIG. 7. In the hydrophilic filter 13 contrary to the hydrophobic filter 12, the water is extracted as the filtrate. The water which has been extracted by the filtration is discharged to the exterior through the water discharge pipe 19. The mixed liquid $M_2'$ in which the concentration of the hydrophobic dewatering cleaning agent $E_1$ has increased owing to the passage of the mixed liquid through the hydrophilic filter 13 is returned to the reserve tank 9. The switch between the hydrophobic filter 12 and the hydrophilic filter 13 can be selectively effected to suit the particular kind of the matrix liquid in the mixed liquid M.

The filtration can be stably carried out constantly in the manner described above. The switch between the hydrophobic filter 12 and the hydrophilic filter 13 may be effected based on the outcome of monitoring the amount on the filtrate being produced or of the result of the ultraviolet absorption analysis performed on the mixed liquid M for the determination of the water content thereof.

As the concentration type filter in the water separation mechanism D, the hydrophobic filter 12 and the hydrophilic filter 13 may be used in combination as described above. As stated previously, the water separation mechanism D may be formed solely of the hydrophobic filter 12 either by additionally providing a mechanism which is capable of removing the water separated by standing at rest and gathered in the lower part of the reserve tank 9 as by manipulation of valves or by additionally using an absorbent. An embodiment involving the additional use of an absorbent will be described below with reference to FIG. 8.

Figure 8:
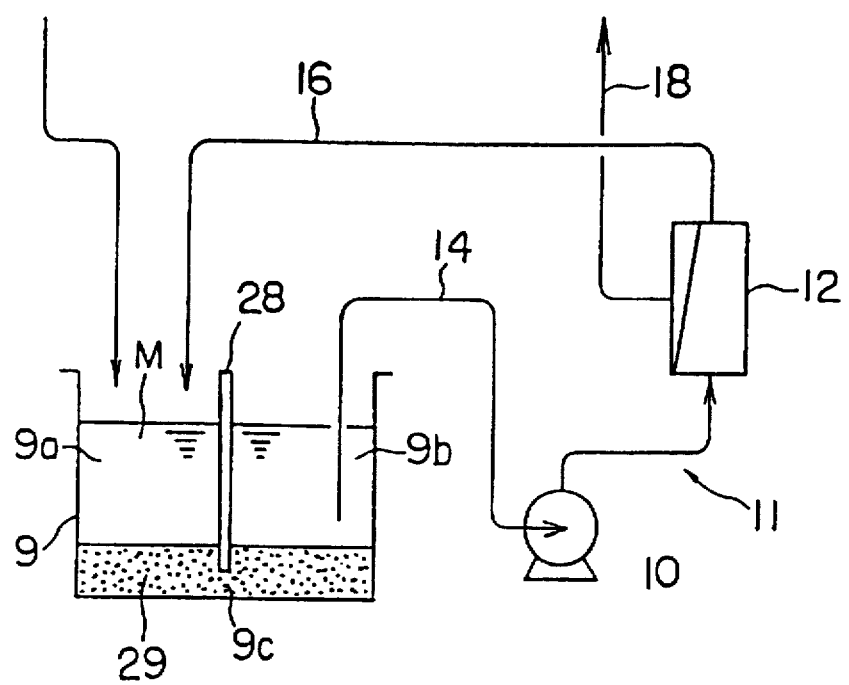

The reserve tank 9 illustrated in FIG. 8 is comprises a shielding plate 28 serving to divide the interior of the reserve tank 9 into two chambers (an inlet part 9a and an outlet part 9b). A liquid path 9c is provided below the shielding plate 28. In the lower part of the reserve tank 9, a water absorbent 29 is so disposed that the hydrophobic dewatering cleaning agent $E_1$ in motion from the inlet part 9a to the outlet part 9b via the liquid path 9c is passed through the interior of the layer of the water absorbent.

As the water absorbent 29, an absorbent macromolecular material which is capable of amply absorbing water exclusively from a system of oil-water mixture, insoluble or sparingly soluble in the hydrophobic dewatering cleaning agent $E_1$, and deficient in reactivity is used. The term "absorbent macromolecular material" is defined as a macromolecular substance which, on contact with water, quickly absorbs the water and swells with the absorbed water and converts the whole volume of the water into a gel. An abundance of such absorbent macromolecular materials are known to the art. These materials are only required to meet the definition given above and are not discriminated on account of the kind of substance. The water absorbent of the type formed of a cross-linked polymer of sodium acrylate may be cited as a concrete example of the water absorbent 29.

The water absorbent 29 of this kind may be prepared in the form of powder, placed in a reticular container incapable of obstructing passage of the hydrophobic dewatering cleaning agent $E_1$, and disposed inside the reserve tank 9. When the water absorbent 29 happens to be in the form of a sheet, it may be directly disposed in the reserve tank 9. The amount of the water absorbent 29 to be disposed in the reserve tank 9 is to be decided in consideration of such factors as the capacity for absorption of water, the amount of water brought in the tank, and the duration of continuous operation of the washing apparatus.

The load on the hydrophobic filter 12 can be lessened by preparatorily causing the water contained in the hydrophobic dewatering cleaning agent $E_1$ to be absorbed by the water absorbent 29 of the type described above. Further, the water absorbent 29 is capable of repressing the rise of the water concentration in the mixed liquid M' which is being returned to the reserve tank 9. Owing to the use of the water absorbent 29 in the manner described above, the water separation mechanism D can be formed solely of the hydrophobic filter 12 because it has no use for the hydrophilic filter. Optionally, the water absorbent 29 may be set in place in the circulation pipe 16.

In Step A for the water displacement which is performed as described above, the part X which has undergone the dewatering cleaning is subsequently forwarded to Step B for rinsing. Step B for the rinsing treatment comprises a third cleaning tank 23 and a fourth cleaning tank 24. The number of cleaning tanks which are provided for Step B may be properly selected so as to suit the quality of cleaning.

In Step B for the rinsing, the part X is rinsed so that the concentration of the surfactant or similar additive contained in the hydrophobic dewatering cleaning agent $E_1$ adhering to the part X will be lowered below the allowable level which is imposed by the quality the part X is expected to possess. This Step B for the rinsing may be omitted, depending on the composition of the hydrophobic dewatering cleaning agent $E_1$.

The third cleaning tank 23 and the fourth cleaning tank 24 contain a rinsing agent $E_2$ similar in hydrophobicity to the hydrophobic solvent used in the aforementioned Step A for the water displacement. The hydrophobic solvent to be used as the rinsing agent $E_2$ does not need to be restricted by the quality of hydrophobicity. Basically for the sake of keeping the practical operational efficiency intact, it is desirable to use a rinsing agent which is identical with the hydrophobic solvent used for the hydrophobic dewatering cleaning agent $E_1$ in Step A for the water displacement and does not contain a surfactant. As a concrete example of the rinsing agent $E_2$, a commercially available silicone type solvent (produced by Kabushiki Kaisha Toshiba and marketed under trademark designation of "Techno Care FRW-1") may be cited.

Thereafter, the part X is forwarded to Step C for drying, wherein the dewatering cleaning is completed as the rinsing agent $E_2$ is removed by vaporization from the surface of the part X. For this Step C for drying, though the drying may be attained with hot air, it is desired to be effected with the vapor of a fluorine type inert liquid which poses no problem concerning IPA or the environment. The use of the vapor in this case contributes to improve further the cleaning quality. As the fluorine type inert liquid for use in the vapor, though a Flon type solvent can be used, a perfluorocarbon containing substantially no chlorine is ideally used in consideration of the effect on the environment or the human body.

The perfluorocarbon is a carbon compound in which substantially all of the substituents linkable with the carbon atoms in the molecular structure thereof are fluorine atoms. Generally, it is in a liquid state at normal room temperature and is nonflammable, nonpoisonous, odorless, highly safe, and contains substantially no chlorine. Thus, it does no harm to the environment. Since the perfluorocarbon shows the same degree of volatility as the Flon type solvent and avoids corroding various materials of metals, plastics, and glass, it manifests the ability to dry efficiently and thoroughly to parts made of varying materials. Further, since the perfluorocarbon shows no compatibility with such hydrophobic solvents as silicone type solvents and isoparaffin type solvents in the neighborhood of room temperature and possesses proper differences in specific gravity from these hydrophobic solvents, it can be separated, recovered, and put to reuse even when the rinsing agent is brought in the Step C for drying.

Concrete of the perfluorocarbon, include, for example, such compounds as are represented by the molecular formulas of $C_3F_6$, $C_4F_8$, $C_5F_{10}$, $C_6F_{12}$, $C_6F_{12}O$, $C_6F_{14}$, $C_7F_{14}$, $C_7F_{14}O$, $C_7F_{16}$, $C_8F_{16}O$, $C_8F_{18}$, $C_9F_{18}O$, and $C_{10}F_{20}O$. Specifically, a commercially available agent (produced by Kabushiki Kaisha Toshiba and marketed under trademark designation of "Techno Care FRV-1") can be used.

The dewatering cleaning apparatus of this embodiment effects the drying of Step C with a vapor. Thus, Step C for drying comprises a vapor cleaning tank 25 which contains a vapor detergent $E_3$ using a perfluorocarbon. The vapor cleaning tank 25 is so constructed that a heater 26 placed in the vapor detergent $E_3$ serves to form the vapor of the vapor detergent $E_3$. The vapor cleaning tank 25 may be otherwise constructed so that the vapor of perfluorocarbon generated in a separately installed vapor generating tank will be supplied to the vapor cleaning tank 25. In the upper part of the vapor cleaning tank 25, a cooling pipe 27 is installed so as to prevent the vapor of perfluorocarbon from diffusing out of the vapor cleaning tank 25.

When such a commercially available agent as Techno Care FRW-1 is used as the rinsing detergent $E_2$ in Step B for rinsing, the drying with hot air in Step C may be carried out by utilizing the volatility of Techno Care FRW-1.

In the dewatering cleaning apparatus of the present embodiment, Step A for water displacement is assisted by the water separation mechanism D as described above, the concentration of water in the hydrophobic dewatering cleaning agent $E_1$ stored in the second cleaning tank 2 for Step A for water displacement can be constantly kept below a fixed level such as, for example, 2% or 3%, depending on the quality of water displacement attained on the part X. Since the water separation mechanism D uses a concentration type filter capable of infallibly removing floating water drops, the water concentration in the hydrophobic dewatering cleaning agent $E_1$ can be kept below the fixed level without fail. The hydrophobic dewatering cleaning agent $E_1$ containing water is circulated between the reserve tank 9 and the concentration type filter and, at the same time, the hydrophobic dewatering cleaning agent $E_1$ from which the water has been removed is returned to the second cleaning tank 2. Owing to the circulation of the hydrophobic dewatering cleaning agent $E_1$ in the manner described above, the concentration of water in the hydrophobic dewatering cleaning agent $E_1$ stored in the second cleaning tank 2 can be constantly kept below the fixed level without adversely affecting the operation of cleaning itself. In Step A for the displacement of water, therefore, the redeposition of water can be infallibly prevented and the water displacement can be attained with stable quality.

The hydrophobic dewatering cleaning agent $E_1$ which has adheres to the surface of the part X because the displacement of water is removed with the rinsing detergent $E_2$ in Step B for rinsing. To be specific, such additive components as surfactant which are contained in the hydrophobic dewatering cleaning agent $E_1$ are removed by the rinsing detergent $E_2$ which is composed solely of a hydrophobic solvent. As a result, the surface of the part X which has undergone the treatment of Step B for rinsing is covered solely with the hydrophobic solvent which is incapable of adversely affecting the quality of the dried part. Such defects as watermarks which degrade the cleaning quality, therefore, can be precluded without fail. Thus, this invention permits superprecision cleaning, for example.

The cleaning apparatus of the embodiment described thus far represents a case of using immersion type cleaning tanks in Step A for water displacement. This invention does not need to be limited to this particular embodiment. By additional provision of a buffer tank, for example, shower cleaning tanks may be used for embodying this invention.

The concentration type filter in the cleaning apparatus shown above will be described below.

The elements 12a and 13a, respectively, of the concentration type filters 12 and 13 selected from various filter elements to suit the substance and composition of the matrix liquid which is subjected to filtration. For example, a porous filter which contains pores of a size in the approximate range of 0.01 μm to 200 μm, desirably 0.5 μm to 10 μm, and more desirably 0.1 μm to 2 μm is used. The pore diameter mentioned above is variable with the substance of the filter or the presence or absence of a surface treatment. Concrete examples of the porous filter, include, for example, ceramic filters, glass filters, organic polymer type filters, and filters of blends thereof. They form hydrophobic filters 12 or hydrophilic filters 13, depending on the material of filter element or the presence or absence of a surface treatment. A hydrophobic filter 12 may be obtained by applying a hydrophobic surface coating to an element substrate inherently possessing hydrophilicity. As the concentration filter in the cleaning apparatus described above, various filters mentioned above may be used as combined in a series or parallel configuration.

In the concentration type filters mentioned above, a porous filter which has been treated with a hydrophobic treating agent containing at least a hydrolyzable organosilane represented by the following general formula (1) is ideally used as the hydrophobic filter 12.

$$R_nSIX_{4-n} \qquad (1)$$

(wherein R stands for a monovalent hydrocarbon group of 1 to 18 carbon atoms, X for a hydrolyzable group, and n for an integer in the range of 1 to 3).

A hydrophobic filter 12 which excels in durability and in the ability to keep pores intact in their initial shape can be obtained by treating a porous filter rich in hydrophilicity with a hydrophobic treating agent containing at least a hydrolyzable organosilane represented by the general formula (1) shown above. Since the hydrophobic treating agent mentioned above allows the required treatment to be carried out effectively at a relatively low temperature, it may well be regarded as excelling in terms of the process of hydrophobic treatment.

The porous filter which has undergone such a hydrophobic coating treatment as described above enables the operation for water separation to be carried out with improved stability because it allows efficient filtration for the mixed liquid having a water content up to about 80%. When the hydrophobic filter 12 is used in combination with the hydrophilic filter 13, the selective switch between these two filters must be made so as to suit the kind of the matrix liquid of the mixed liquid. In the case of two filters of the conventional kind, the possibility exists that they must be switched frequently when the amount of the hydrophobic dewatering cleaning agent $E_1$ and that of water are roughly equal. The use of the porous filters which have undergone the aforementioned hydrophobic coating treatment described by this invention permits the operation of water separation to be carried out with increased stability.

Among other various materials mentioned above as usable for the porous filter which is destined to undergo the hydrophobic treatment, ceramic materials prove particularly desirable. Matrix materials for the ceramic filter, include, for example, siliceous materials as glass, silica, and wollastonite and nonsiliceous materials as alumina, nickel oxide, and titanite. Among other matrix materials mentioned above, alumina proves particularly desirable.

The minute pores in the filter are desired to have an average diameter in the range of 0.01 to 200 μm, preferably 0.5 to 10 μm. If the average diameter of the minute pores is smaller than 0.01 μm, the minute pores are liable to be clogged when the filter is treated with silane. If the average diameter exceeds 200 μm, the produced filter is deficient in the ability to separate water. The term "average diameter" used herein refers to the numerical value which is obtained by randomly selecting at least five portions in a given filter, photographing these portions with a scanning electron microscope (100 to 50,000 magnifications), measuring the largest diameters of 10 randomly selected pores in each of the electron micrographs, and computing the normal distributions.

As concrete examples of the monovalent hydrocarbon group of 1 to 18 carbon atoms represented by the symbol R in the general formula (1)include, for example, such alkyl groups as methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group, such cycloalkyl groups as cyclohexyl group, such aryl groups as phenyl group, vinyl group, such alkenyl groups as allyl group, and such aralkyl groups as βphenylethyl group and γ-phenylpropyl group. For the purpose of imparting outstanding repellency to the filter, alkyl groups prove particularly desirable among other hydrocarbon groups mentioned above. The alkyl groups of 3 to 16 carbon atoms, particularly the alkyl groups of 4 to 10 carbon atoms prove desirable in respect that they impart excellent repellency to the produced filters and the relevant raw materials are easy to procure, synthesize, and purify. When the variable n in the general formula (1) is 2 or 3, the R's may be identical or different. The variable n is desired to be 1 in the sense that the relevant silane has a high reaction velocity.

Concrete examples of the hydrolyzable group represented by X in the general formula (1), include, for example alkoxyl group, acyloxy group, amino group, aminoxy group, oxime group, ketoxime group, amide group, alkenyloxy group, and halogen atoms. Among other hydrolyzable groups mentioned above, the alkoxyl group proves particularly desirable in respect that the relevant hydrophobic treating agent has no possibility of corroding the material forming the filter and enjoys ideal storability and that the by-product which occurs during the curing reaction of the hydrophobic coating can be easily disposed of. Among other alkoxyl groups, the methoxyl group proves particularly desirable in the sense that the relevant hydrophobic treating agent gives a moderate curing speed.

The silane represented by the general formula (1) may be used in the form of a partial hydrolyzate. The silanes of this formula (1) may be used either singly or in the form of a mixture of two or more members. It is particularly desirable to use a silane whose substituent R is a monovalent hydrocarbon group of 5 to 18 carbon atoms in combination with a silane whose substituent R is a monovalent hydrocarbon group of 1 to 4 carbon atoms. The combined use of these two silanes facilitates the hydrophobic treatment performed on the minute pores in the filter and renders difficult the occurrence of untreated part. It is desirable that the hydrophobic treating agent contain the silane having a monovalent hydrocarbon group of 5 to 18 carbon atoms in a concentration of not less than 50% by weight in the sense that the hydrophobic treating agent imparts ample hydrophobicity.

Further, for the purpose of enhancing the strength and durability of the hydrophobic film to be formed in the minute pores in the treated filter, a hydrophobic treating agent which has incorporated in a blended form therein a polyorganosiloxane having hydroxyl groups one each at the opposite terminals thereof may be used. The organic group of this polyorganosiloxane is identical to the substituent R described above. Among other concrete examples of R, alkyl groups and aryl groups, especially methyl groups, prove particularly desirable from the standpoint of the effect produced in enhancing the strength of film and the availability of the raw material. The viscosity of this polyorganosiloxane is desired to be less than 200,000 cSt. If the viscosity exceeds 200,000 cSt, the relevant hydrophobic treating agent is too viscous to permit easy handling of itself or give an easy hydrophobic treatment to the filter. The viscosity is preferably in the range of 20 to 20,000 cSt.

The amount of this polyorganosiloxane to be incorporated in the hydrophobic treating agent is desired to be in the range of 1 to 100 parts by weight, based on 100 parts by weight of the silane mentioned above in the sense that the polyorganosiloxane used at this concentration enjoys good compatibility with silane and the produced hydrophobic treating agent shows ideal workability. From the standpoint of exalting the strength of film, the amount in question is desired to exceed 1 part by weight. Preferably, this amount is in the range of 5 to 20 parts by weight.

For the purpose of improving the adhesiveness of the film formed in the minute pores to the filter and enhancing the durability of the hydrophobicity, a silane whose substituent R in the general formula (1) is an alkyl group containing a glycidyl group, acryl group, methacryl group, or amino group may be used. Concrete examples of the substituent R in this case, include, for example, γ-glycidoxypropyl group, y-methacryloxypropyl group, and γ-amino-propyl group. The amount of this silane to be incorporated in the hydrophobic treating agent is desired to be in the approximate range of 0.1 to 10% by weight, based on the total amount of silane. This amount is desired to be not more than 10% by weight in the sense that the film to be formed in the minute pores of the filter acquires ideal hydrophobicity. From the standpoint of enhancing the adhesiveness of the film, this amount is desired to be not less than 0.1% by weight. In this case, the variable n in the general formula (1) is desired to be 1 from the standpoint of the curing speed to be involved in the formation of the film.

The hydrophobic treating agent which contains at least a hydrolyzable silane represented by the general formula (1) shown above is desired to incorporate therein a hydrolytic catalyst for the sake of promoting the curing reaction which proceeds during the treatment of the filter. The catalysts which are effectively usable herein include, for example, metal salts of organic carboxylic acids such as dibutyl tin dilaurate, dibutyl tin diacetate, butyl tin tri-2-ethylhexoate, stannous caprylate, tin naphthenate, tin oleate, iron-t-ethylhexoate, lead-2-ethyloctoate, manganese-2-ethylhexoate, zinc-2ethylhexoate, titanium naphthenate, zinc naphthenate, cobalt naphthenate, and zinc stearate, organic titanic esters such as tetrabutyl titanate, tetra-2-ethylhexyl titanate, triethanol amine titanate, and tetra (isopropenyloxy) titanate, organic titanium compounds such as organosiloxy titanium and βcarbonyl titanium, aminoalkyl group-substituted alkoxy silanes such as γ-aminopropyl triethoxy silane and N-(trimethoxysilylpropyl) ethylene diamine, amine compounds such as hexyl amine and phosphoric acid dodecyl amine and derivatives thereof, quaternary ammonium salts such as benzyl triethyl ammonium acetate, lower fatty acid salts of alkali metals such as potassium acetate, sodium acetate, and lithium oxalate, dialkyl hydroxyl amines such as dimethyl hydroxyl amine and diethyl hydroxyl amine, guanidine compounds such as dialkyl hydroxyl amine and tetramethyl guanidine, and guanidyl group-containing silanes and siloxane compounds, for example.

The amount of the hydrolytic catalyst to be incorporated in the hydrolyzable silane is desired to be in the range of 0.01 to 10 parts by weight, preferably 0.1 to 5 parts by weight, based on 100 parts by weight of the hydrolyzable silane. The amount is desired to be not less than 0.1 part by weight for the sake of heightening the curing speed and increasing the efficiency of the treatment. This amount is desired to be not more than 5 parts by weight for the purpose of imparting an ample pot life to the product of the treatment.

The hydrophobic treating agent which has incorporated such a hydrolyzable silane as mentioned above together with a polyorganosiloxane and a hydrolytic catalyst is desired to be used as dissolved in a solvent for the sake of facilitating the treatment given to the filter. The solvents which are usable effectively in the solution of the hydrophobic treating agent in this case include alcohols such as methanol, ethanol, and IPA, ether alcohols such as ethylene glycol monomethyl ether, ethylene glycol monoethyl ether, tetrahydrofuran, and dioxane and ethers, ketones such as acetone, methylethyl ketone and diethyl ketone, esters such as methyl acetate, ethyl acetate, and butyl acetate, aliphatic hydrocarbons such as hexane, gasoline, rubber gasoline, mineral spirit, and kerosene, aromatic hydrocarbons such as benzene, toluene, and xylene, and other similar organic solvents, for example.

The amount of such a solvent to be used herein is desired to be in the range of 50 to 2,000 parts by weight, preferably 100 to 1,000 parts by weight, based on 100 parts by weight of the hydrolyzable silane. This amount is desired to be not less than 50 parts by weight from the standpoint of facilitating the treatment which is given to the filter as by immersion in the treating agent. It is desired to be not more than 2,000 parts by weight for the sake of giving the treating liquid such a concentration as befits the formation of an ideal hydrophobic film in the minute pores of the filter.

The hydrolyzable silane represented by the general formula (1) can be used further in combination with other hydrophobicity-imparting agent, organic resin, and monomers as raw materials therefor. Concrete examples of the hydrophobicity-imparting agent, include, for example, natural waxes such as spermaceti wax, beeswax, and carnauba wax, synthetic waxes such as cetyl palmitate, myricyl palmitate, methyl cerotate, and ceryl cerotate, aliphatic hydrocarbons such as octadecane, eicosane, docosane, tetracosane, octacosane, triacontane, and pentatriacontane, and polycyclic aromatic hydrocarbons such as naphthalene, anthracene, phenanthrene, chrysene, and pyrene concrete examples of the organic resin,include, for example, polystyrene, polyesters, polyurethanes, polyamides, polyacetic acid resin, epoxy resin, and acryl resin. Concrete examples of the monomer, including, for example, esters such as methyl acrylate, ethyl acrylate, isobutyl acrylate, methyl methacrylate, ethyl methacrylate, trimethylol propane trimethacrylate, methyl maleate, methyl fumarate, diallyl phthalate, and vinyl acetate may be cited. For the purpose of increasing the strength of a hydrophobic film and improving the durability thereof, organic resins and monomers thereof and particularly esters of methacrylic acid or acrylic acid are used advantageously.

The total amount of such hydrophobicity-imparting agent, organic resin, and monomers thereof to be incorporated in the hydrolyzable silane is desired to be in the range of 0.1 to 100 parts by weight, preferably 0.5 to 50 parts by weight, based on 100 parts by weight of the hydrolyzable silane for the sake of improving the durability without a sacrifice of satisfactory hydrophobicity. When the organic resin monomers mentioned above are to be incorporated in the hydrolyzable silane, they may be accompanied by a polymerization initiator or a storage stabilizer which is proper therefor.

The concentration type filter constructed as described above can be obtained by diluting the hydrolyzable silane and other components with a solvent thereby preparing a treating solution, immersing the porous filter in the solution, drying the wet porous filter in draft, and thermally setting the dry porous filter. Generally, the solvent is used advantageously because it dissolves the hydrolyzable silane and other components into a homogeneous solution, lowers the viscosity of the treating liquid and improves the processing power thereof, and permits the quantity of treatment given to the minute pores in the filter to be adjusted by properly varying the concentration of silane in the treating liquid. The treating liquid can be formed by using a silane of low viscosity and other components of sufficient compatibility and consequently obviating the necessity for a solvent. In this case, the wet filter extracted from the treating liquid does not need to be dried in draft but may be thermally set. Though the treatment of the filter is generally effected by immersing the filter in the treating liquid, it may be otherwise accomplished by forcibly forwarding the treating liquid through the interior of the filter. This forced passage of the treating liquid through the filter enables the treatment of the minute pores in the filter to be completed quickly and infallibly.

Though the treating liquid produced as described above can be set at a relatively low temperature, the treatment is carried out generally at a temperature in the range of from normal room temperature to about 25° C. Where the use of an organic resin or a monomer thereof is omitted, the treating liquid can be set at a relatively low temperature desirably in the range of from normal room temperature to about 150° C. Where the use of an organic resin or a monomer thereof is involved, the treatment is desired to be carried out at a temperature in the approximate range of 50 to 200° C., preferably 50 to 150° C. The duration of this heat treatment is freely selected generally in the approximate range of 10 minutes to two hours.

Concrete examples of the concentration type filter explained above and the results of the evaluation thereof will be described below.

Examples 1 to 4 and Comparative Experiment A

Treating liquids were prepared with varying compositions indicated in Table 1. High-purity alumina ($Al_2O_3$ of purity of 99.9%) ceramic filters containing minute pores of an average diameter of 0.5 μm (produced by Toshiba Ceramics Co., Ltd. and marketed under trademark designation of "MEMBRALOX") were severally left standing in the treating liquids for three hours. The ceramic filters were extracted from the treating liquids, dried in draft, and thermally set at 50° C. for one hour.

Through the treated ceramic filters, an equivolumetric mixture of silicone oil (octamethyl cyclotetrasiloxane) and water as an oil-water mixture was circulated for filtration. This circulatory filtration was effected by placing the oil-water mixture in a tank provided with a stirrer and circulating this oil-water mixture via a given ceramic filter. The silicone oil separated as a filtrate and the residue of the filtration were recovered in the respective feed tanks. This circulatory filtration test was continued until a given ceramic filter ceased to offer effective filtration of the oil-water mixture because of leakage of water on the filtrate side or occurrence of clogging in the filter. The durability of this ceramic filter was determined based on the duration of continued service of the filter.

A cylindrical container provided in the bottom part thereof with a circular ceramic filter plate (6 cm in diameter) made of the same material and containing the same minute pores as mentioned above was prepared. Water was continuously poured into this cylindrical container. The depth of the water in the cylindrical container which was found when the filter began to leak the water was used as the measure for the resistance of the filter to water pressure. The results were additionally shown in Table 1.

TABLE 1

|  | Example |  |  |  | CE |
| --- | --- | --- | --- | --- | --- |
|  | 1 | 2 | 3 | 4 | A* |
| Composition (parts by weight) |  |  |  |  |  |
| Hydrolyzable silane |  |  |  |  |  |
| $C_6H_{13}Si(OC_3H_7)_3$ | 20 | — | 15 | 15 | — |
| $C_8H_{17}Si(OC_2H_5)_3$ | — | 10 | — | — | — |
| $C_{12}H_{24}Si(OCH_3)_3$ | — | 10 | — | — | — |
| $CH_3Si(OCH_3)_3$ | — | — | 5 | — | — |
| $C_3H_7Si(OCH_3)_3$ | — | — | — | 5 | — |
| Setting catalyst |  |  |  |  |  |
| Dibutyl tin dilaurate | 0.1 | 0.1 | 0.1 | 0.1 | — |
| Solvent |  |  |  |  |  |
| IPA | 80 | 80 | 80 | 80 | — |
| Evaluation |  |  |  |  |  |
| Durability (hours) | 620 | 500 | 750 | 700 | 1 max |
| Resistance to water (mm) | 90 | 110 | 75 | 80 | 5 max |

Note:
"max" = not more than
*: Comparative Experiment A = Untreated ceramic filter The data of durability (in hours) shown in Table 1 represent the resuls obtained when the liquid flowed in one fixed direction through the interior of the filter. A practical apparatus can be operated so as to offer substantially lasting durability by giving such a backwash as described above to the apparatus.

Examples 5 to 7 and Comparative Experiment B

Treating liquids of varying compositions indicated in Table 2 were prepared. Ceramic filters containing minute pores of an average diameter of 2.0 μm [determined by taking scanning electron micrographs (1,000 magnifications) at five randomly selected portions of a given sample, measuring ten randomly selected minute pores in each photograph, and computing the normal distribution using the results of the measurement] were severally treated with the treating liquids mentioned above by following the procedure of Example 1 while changing the conditions for thermal setting to 100° C. and one hour. The treated ceramic filters were tested for durability in the same manner as in Example 1. The results are additionally shown in Table 2.

TABLE 2

|  | Example | | | CE |
|---|---|---|---|---|
|  | 5 | 6 | 7 | B |
| Composition (parts by weight) | | | | |
| Hydrolyzable silane | | | | |
| $C_6H_{13}Si(OC_3H_7)_3$ | — | — | 15 | — |
| $C_8H_{17}Si(OC_2H_5)_3$ | 15 | 15 | — | — |
| Polyorganosiloxane | | | | |
| Terminal OH-sealed polydimethyl siloxane (viscosity: 700 cSt) | 5 | — | — | — |
| Teurminal OH-sealed polydimethyl siloxane (viscosity: 12,000 cSt) | — | 5 | — | — |
| Setting catalyst | | | | |
| Dibutyl tin dilaurate | 0.1 | 0.1 | 0.1 | — |
| Resin composition | | | | |
| Methyl methacrylate | — | — | 4 | 16 |
| Trimethylol propane trimethacrylate | — | — | 0.5 | 2 |
| Polymethyl methacrylate | — | — | 0.5 | 2 |
| Dimethyl-p-toluidine | — | — | 0.1 | 0.4 |
| Benzoyl peroxide | — | — | 0.1 | 0.4 |
| Solvent | | | | |
| IPA | 80 | 80 | 80 | 80 |
| Evaluation | | | | |
| Durability (hours) | 700 | 750 | 850 | 5 |

Examples 8 to 11

Treating liquids of the varying compositions indicated in Table 3 were prepared. The same ceramic filters as were used in Example 1 were treated with the treating liquids in the same manner as in Example 1. The treated ceramic filters were tested for durability by following the procedure of Example 1 while changing the temperature of the oil-water mixture to 60° C. The results are additionally shown in Table 3.

TABLE 3

|  | Example | | | |
|---|---|---|---|---|
|  | 8 | 9 | 10 | 11 |
| Composition (parts by weight) | | | | |
| Hydrolyzable silane | | | | |
| $C_8H_{17}Si(OC_2H_5)_3$ | 20 | 18 | 18 | — |
| $C_8H_{17}SiCl_3$ | — | — | — | 18 |
| γ-Glycidoxypropyl trimethoxysilane | — | 2 | — | 2 |
| γ-Aminopropyl trimethoxysilane | — | — | 2 | — |
| Setting catalyst | | | | |
| Dibutyl tin dilaurate | 0.1 | 0.1 | 0.1 | 0.1 |

TABLE 3-continued

|  | Example | | | |
|---|---|---|---|---|
|  | 8 | 9 | 10 | 11 |
| Solvent | | | | |
| IPA | 80 | 80 | 80 | 80 |
| Evaluation | | | | |
| Durability (hours) | 250 | 600 | 550 | 350 |

Example 12

A treating liquid of the same composition as used in Example 5 was prepared. A glass filter containing minute pores having an average diameter of 3.0 μm [determined by taking scanning electron micrographs (1,000 magnifications) at five randomly selected portions of a given sample, measuring ten randomly selected minute pores in each photograph, and computing the normal distribution using the results of the measurement] was kept immersed in the treating liquid for two hours. The glass filter was extracted from the liquid, dried in draft, and then thermally set at 100° C. for one hour. The glass filter was tested for durability in the same manner as in Example 1. Thus, it was found to possess good durability of 620 hours. Example 13

A treating liquid of the same composition as used in Example 1 was prepared. A glass filter containing minute pores having an average diameter of 0.5 μm [determined by taking scanning electron micrographs (1,000 magnifications) at five randomly selected portions of a given sample, measuring ten randomly selected minute pores in each photograph, and computing the normal distribution using the results of the measurement] was kept immersed in the treating liquid for three hours. The glass filter was extracted from the liquid, dried in draft, and then thermally set at 50° C. for one hour. The glass filter was tested for durability in the same manner as in Example 1. Thus, it was found to possess good durability of 500 hours. Example 14

A treating liquid of the same composition as used in Example 10 was prepared. An organic macromolecular filter of the grade for water purification obtained by bundling polyamide fibers (produced by Mitsubishi Chemical Industry Co., Ltd.) was kept immersed in the treating liquid for one hour, extracted from the liquid, dried in draft, and then thermally set at 50° C. for two hours. The organic macromolecular filter thus obtained was tested for durability in the same manner as in Example 1. Thus, it was found to possess good durability of 720 hours.

Example 15

A treating liquid of the same composition as used in Example 1 was prepared. An organic macromolecular filter of polyethylene resin containing minute pores of an average diameter of 1.0 μm (produced by Sekisui Chemical Co., Ltd. and marketed under trademark designation of "Cellpore W-01") was kept immersed in the treating liquid for three hours, removed from the liquid, dried in draft, and then thermally set at 50° C. for one hour. The organic macromolecular filter thus obtained was tested for durability in the same manner as in Example 1. Thus, it was found to possess good durability of 300 hours. Example 16

A treating liquid of the same composition as used in Example 2 was prepared. A composite filter (made of a mixture of cross-linked polyvinyl alcohol with alumina ceramic) containing minute pores of an average diameter of 2.0 μm [determined by taking scanning electron micrographs (1,000 magnifications) at five randomly selected portions of a given sample, measuring ten randomly selected minute pores in each photograph, and computing the normal distribution using the results of the measurement] was kept immersed in the treating liquid for four hours, removed from the liquid, dried in draft, and then thermally set at 40° C. for two hours. The composite filter thus obtained was tested for durability in the same manner as in Example 1. Thus, it was found to possess good durability of 550 hours.

Example 17

A treating liquid of the same composition as used in Example 1 was prepared. A composite filter (made of a mixture of polyphenylene sulfide with glass) containing minute pores having an average diameter of 1.0 μm [determined by taking scanning electron micrographs (1,000 magnifications) at five randomly selected portions of a given sample, measuring ten randomly selected minute pores in each photograph, and computing the normal distribution using the results of the measurement] was kept immersed in the treating liquid for three hours, removed from the liquid, dried in draft, and then thermally set at 50° C. for one hour. The composite filter thus obtained was tested for durability in the same manner as in Example 1. Thus, it was found to possess good durability of 350 hours.

It is clearly noted from the results of evaluation obtained in the concrete examples cited above that the porous filters (concentration type filters) treated with hydrophobic treating liquid containing hydrolyzable silanes represented by the general formula (1) attain separation of water from an oil phase or extraction of oil from an oil-water mixture with high efficiency and exhibit outstanding lasting hydrophobicity. When they are used as hydrophobic filters in accordance with this invention, they allow dewatering cleaning to proceed with high efficiency. The hydrolyzable silanes mentioned above are highly effective in fulfilling the process of treating the porous filters because they easily handle the porous filters and readily cure even at comparatively low temperatures.

Incidentally, the concentration type filters mentioned above can be effectively utilized not only for the dewatering cleaning contemplated by the present invention but also for the separation of water from varying kinds of oil phase and the extraction of oils therefrom.

Industrial Practicability of the Invention:

This invention allows the water concentration in a dewatering cleaning agent to be kept constantly below a fixed level as described above. As a result, the water in the dewatering cleaning agent can be infallibly precluded from being redeposited on parts under treatment and the parts can be given a cleaning of stable quality at all times. Thus, the method of this invention for surface treatment can be effectively utilized for various types of dewatering cleaning in the place of the existing cleaning with the Flon type detergents. Further, since the concentration type filters of this invention can stably fulfill the separation of water from an oil phase and the extraction of oil therefrom for a long time, they can be effectively utilized for the separation of water from various kinds of oil phase or the extraction of oil therefrom.

We claim:

1. A method for removing at least one of residual water and aqueous detergent from a surface of a part, comprising
treating the part with a hydrophobic treating agent in at least one cleaning tank to remove at least one of water and aqueous detergent from the surface of the part, whereby at least a portion of the removed at least one of water and aqueous detergent mingles in at least one cleaning tank with the hydrophobic treating agent,
transmitting the hydrophobic treating agent with the mingled at least one of water and an aqueous detergent from at least one cleaning tank to a reserve tank and temporarily storing the hydrophobic treating agent and the mingled at least one of water and aqueous detergent,
circulating the hydrophobic treating agent with the mingled at least one of water and an aqueous detergent in the reserve tank through at least one filter, whereby the at least one filter removes the mingled at least one of water and aqueous detergent from the hydrophobic agent,
wherein the filter comprises a porous substrate that has a coating formed on an inner surface of the pores, and
returning the hydrophobic treating agent from which at least one of water and aqueous detergent has been removed by the at least one filter to at least one cleaning tank.

2. A method according to claim 1, which further comprises after the part is treated in the at least one cleaning tank, rinsing the part with a rinsing agent and then drying the part.

3. A method according to claim 2, wherein the rinsing agent is selected from at least one of the group consisting of silicone solvents and isoparaffin solvents.

4. A method according to claim 1, wherein after the part is treated in the at least one cleaning tank, the part is dried by use of a vapor drying agent.

5. A method according to claim 4, wherein the vapor drying agent comprises a perfluorocarbon.

6. A method according to claim 1, which further comprises prior to the treating of the part in at least one cleaning tank, pretreatment of the part with at least one of water and aqueous detergent which leaves at least one of residual water and residual aqueous detergent on the surface of the part.

7. A method according to claim 1, wherein the at least one filter comprises a hydrophobic filter.

8. A method according to claim 1, wherein the at least one filter comprises a hydrophobic filter and a hydrophilic filter which are used in combination.

9. A method according to claim 1, wherein the hydrophobic treating agent comprises at least one agent selected from the group consisting of silicone solvents and isoparaffin solvents.

10. A method according to claim 9, wherein the hydrophobic treating agent further comprises at least one of surfactants and hydrophilic solvents.

11. A method according to claim 1, wherein the method is a continuous process such that after the hydrophobic treating agent is returned to the at least one cleaning tank, another part is treated in the at least one cleaning tank.

12. A method according to claim 1, wherein the at least one filter has been treated with a liquid hydrophobic agent comprising at least one hydrolyzable organosilane represented by the formula $R_nSiX_{4-n}$, wherein R is a monovalent hydrocarbon group of 1 to 18 carbon atoms, X is a hydrolyzable group, and n is an integer from 1 to 3.

13. A method according to claim 12, wherein R is a monovalent hydrocarbon group of 4 to 18 carbon atoms.

14. A method according to claim 12, wherein X is an alkoxy group.

15. A method according to claim 12, wherein the porous filter is a ceramic filter.

16. A method according to claim 1, further comprising removing a portion of the at least one of water and aqueous detergent removed from the part, from at least one of the cleaning tanks by sedimentation.

17. A method according to claim 1, wherein after the part is treated in a first cleaning tank, the part is then treated in a second cleaning tank with a treating agent and ultrasound.

18. A method according to claim 1, wherein the coating of the porous filter is applied by immersing the porous filter into a solution comprising a hydrolyzable silane, drying the wet filter, and thermally setting the hydrolyzable silane on the inner surface of pores in the filter.

19. A method according to claim 18, wherein the solution comprises a hydrolyzable silane and a hydrolytic catalyst.

20. A method according to claim 1, wherein the coating on the filter is applied by bringing a treating liquid into contact with the filter.

21. A method according to claim 20, wherein the coating is applied by immersing the filter into a solution comprising the coating.

22. A method according to claim 1, wherein the filter has at least one filter element with a filter membrane, wherein during the filtering, only either the (i) hydrophobic treating agent or (ii) the at least one of water and aqueous detergent permeates the filter element in all directions perpendicular to a direction which (i) and (ii) pass through the filter element, thereby separating the at least one of the water or aqueous detergent from the hydrophobic agent.

23. A method according to claim 22, wherein the filter is a hydrophobic filter and only the hydrophobic treating agent permeates the filter.

24. An apparatus according to claim 22, wherein the filter is a hydrophobic filter and is adapted such that only the hydrophobic treating agent permeates the filter.

25. A method according to claim 22, wherein the filter is a hydrophilic filter and only the at least one of water and aqueous detergent permeates the filter.

26. An apparatus according to claim 22, wherein the filter is a hydrophilic filter and is adapted such that only the at least one of water and aqueous detergent permeates the filter.

27. A method according to claim 1, wherein the pores of the filter have an average diameter in the range of 0.01 to 200 micrometers.

28. An apparatus adapted to remove residual water or aqueous detergent from a surface of a part comprising at least one cleaning tank adapted to contain a hydrophobic treating agent capable of removing at least one of water and an aqueous detergent from the surface of a part, a reserve tank adapted to temporarily store hydrophobic treating agent, at least one filter adapted to remove at least one of water and aqueous detergent from the hydrophobic treating agent, wherein the filter comprises a porous substrate that has a coating formed on an inner surface of the pores, and a circulation system for circulating the hydrophobic treating agent from the reserve tank to the at least one filter and back to at least one of the cleaning tanks.

29. An apparatus according to claim 28, wherein the at least one filter comprises a hydrophobic filter.

30. An apparatus according to claim 28, wherein the at least one filter comprises a hydrophobic filter and a hydrophilic filter, and wherein the hydrophobic and hydrophilic filter are adapted to be selectively used depending upon the amount of water or aqueous detergent to be removed from the hydrophobic treating agent.

31. An apparatus according to claim 28, wherein the filter has been treated with a liquid hydrophobic agent comprising at least one hydrolyzable organosilane represented by the formula $R_nSiX_{4-n}$, wherein R is a monovalent hydrocarbon group of 1 to 18 carbon atoms, X is a hydrolyzable group, and n is an integer from 1 to 3.

32. An apparatus according to claim 31, wherein the porous filter is a ceramic filter.

33. An apparatus according to claim 28, wherein the at least one filter includes a backwash mechanism adapted to unclog the filter.

34. An apparatus according to claim 28, wherein the reserve tank includes a water absorbent adapted to absorb water from the hydrophobic treating agent.

35. An apparatus according to claim 28, wherein the filter has at least one filter element with a filter membrane, which is adapted such that during filtering, only either the (i) hydrophobic treating agent or (ii) the at least one of water and aqueous detergent permeate the filter element in all directions perpendicular to a direction which (i) and (ii) pass through the filter element, thereby separating the at least one of water or aqueous detergent from the hydrophobic agent by filtration.

36. An apparatus according to claim 28, wherein the pores of the filter have an average diameter in the range of 0.01 to 200 micrometers.

37. A filter comprising a porous filter treated on at least an inner surface of the pores, with a liquid hydrophobic agent comprising at least one hydrolyzable organosilane represented by the formula $R_nSiX_{4-n}$, wherein R is a monovalent hydrocarbon group of 1 to 18 carbon atoms, X is a hydrolyzable group, and n is an integer from 1 to 3.

38. A filter according to claim 37, wherein the porous filter is a ceramic filter.

39. A filter according to claim 37, wherein the porous filter has pores of an average diameter of from 0.01 to 200 micrometers.

40. A filter according to claim 37, wherein the hydrophobic agent comprises two of the hydrolyzable organosilanes, one having R as a monovalent hydrocarbon group of 5 to 18 carbon atoms, and one having R as a monovalent hydrocarbon group of 1 to 4 carbon atoms.

41. A filter according to claim 37, wherein the hydrophobic agent further comprises a polyorganosiloxane.

42. A filter according to claim 37, wherein the hydrophobic agent further comprises a hydrolytic catalyst.

43. A filter according to claim 37, wherein the hydrophobic agent further comprises a silane of the formula $R_nSiX_{4-n}$, wherein X is a hydrolyzable group, n is an integer from 1 to 3, and wherein R is an alkyl group containing a glycidyl, acryl, methacryl, or amino group.

* * * * *

UNITED STATES PATENT AND TRADEMARK OFFICE
CERTIFICATE OF CORRECTION

PATENT NO. : 5,782,983  
DATED : July 21, 1998  
INVENTOR(S) : Inada et al

Page 1 of 2

It is certified that error appears in the above-identified patent and that said Letters Patent is hereby corrected as shown below:

On the title page: , Item [73] Assignees: change Kabushiki Kaisha Toshiba, Kawasaki; Toshiba Silicone Co., Ltd., Tokyo, both of Japan and replace with --Toshiba Silicone Co., Ltd., Tokyo, Japan--.

Item [56] References cited: insert after U.S. PATENT DOCUMENTS:

| | | | |
|---|---|---|---|
| --4,090,307 | 05/1978 | Gollmick | 34/9 |
| 4,788,043 | 11/1988 | Kagiyama | 422/292 |
| 4,387,195 | 06/1993 | Tully | |
| 2,306,222 | 12/1942 | General Electric Company-- | |

Insert after FOREIGN PATENT DOCUMENTS:

| | | |
|---|---|---|
| --2 328 497 | 10/1976 | French Patent Office |
| 0 458 969 | 12/1991 | European Patent Office |
| 04 219131 | 12/1992 | Japanese Patent Office |
| 628 464 | 08/1949 | Great Britain Patent Office |
| 0 320 033 | 06/1989 | European Patent Office |
| 0 392 362 | 10/1990 | European Patent Office-- |

UNITED STATES PATENT AND TRADEMARK OFFICE
CERTIFICATE OF CORRECTION

PATENT NO. : 5,782,983
DATED : July 21, 1998
INVENTOR(S) : Inada et al

It is certified that error appears in the above-identified patent and that said Letters Patent is hereby corrected as shown below:

IN THE CLAIMS:

Column 23, line 32, delete "22" and insert therefore --28--.

Column 23, line 38, delete "22" and insert therefore --28--.

Signed and Sealed this

Seventeenth Day of October, 2000

Attest:

Q. TODD DICKINSON

*Attesting Officer*   *Director of Patents and Trademarks*